(12) United States Patent
Wieschermann et al.

(10) Patent No.: US 6,390,913 B1
(45) Date of Patent: May 21, 2002

(54) VEHICLE WITH VENTILATION CHANNEL AND LIGHTING FACILITY

(75) Inventors: Jochen Wieschermann, Salem (DE); Peter Rysavy, Zurich (CH)

(73) Assignee: Alcan Technology & Management Ltd., Rheinfall (CH)

(*) Notice: Subject to any disclaimer, the term of this patent is extended or adjusted under 35 U.S.C. 154(b) by 0 days.

(21) Appl. No.: 09/501,145

(22) Filed: Feb. 9, 2000

(30) Foreign Application Priority Data

Feb. 26, 1999 (EP) .............................. 99810166

(51) Int. Cl.[7] .............................. F24F 3/056
(52) U.S. Cl. ..................... 454/108; 362/96; 362/218; 362/480; 454/294
(58) Field of Search ............. 454/76, 104, 108, 454/137, 293, 294, 295; 362/480, 219, 221, 260, 98, 218

(56) References Cited

U.S. PATENT DOCUMENTS

| | | | |
|---|---|---|---|
| 2,167,383 A | * 7/1939 | Arenberg | |
| 2,526,828 A | * 10/1950 | Phillips | .................. 454/108 X |
| 2,902,917 A | * 9/1959 | Peterson | ...................... 454/108 |
| 2,902,918 A | * 9/1959 | Swarner | ................. 454/108 X |
| 4,387,415 A | 6/1983 | Domas | |
| 5,595,432 A | * 1/1997 | Vanderhoof | ................. 362/480 |
| 5,752,760 A | 5/1998 | Dealey, Jr. et al. | |

FOREIGN PATENT DOCUMENTS

WO 86/02138 4/1986

* cited by examiner

Primary Examiner—Harold Joyce
(74) Attorney, Agent, or Firm—Bachman & LaPointe, P.C.

(57) ABSTRACT

A vehicle with a compartment, a ventilation channel on the ceiling or in a side wall of the compartment running in the longitudinal or transverse direction of the vehicle and a lighting facility with lighting elements is such that the ventilation channel features a reflector box with a channel base, featuring openings that are at least in part transparent to light or light-admitting openings, fitted facing the interior of the passenger compartment, and the lighting elements of the lighting facility are situated inside the ventilation channel. As a result of lighting facility being integrated in the ventilation channel, the amount of space required is less and the ventilation channel with integral lighting can be in the form of a pre-assembled unit.

19 Claims, 2 Drawing Sheets

VEHICLE WITH VENTILATION CHANNEL AND LIGHTING FACILITY

BACKGROUND OF THE INVENTION

The invention relates to a vehicle with a compartment, at least one ventilation channel situated on the ceiling or on a side wall of the compartment running in the longitudinal or transverse direction of the vehicle, and a lighting facility with lighting elements.

Vehicles of the above mentioned kind are e.g. rail-bound vehicles, magnetically levitated vehicles or road-bound vehicles, in particular railway vehicles with passenger space in the form of a compartment.

In known vehicles with air conditioning systems at least one ventilation channel runs along the ceiling or the side wall of the compartment in the longitudinal direction of the vehicle; the ventilation channel is for supplying fresh air to or removing used air from the passenger space. The lighting facility comprises e.g. continuous lighting strips which run beside the ventilation channel and features lighting elements behind the lighting strips. Another known lighting facility is such that the lighting is indirect i.e. the lighting elements are partially covered e.g. by parts of the wall or ceiling.

One disadvantage of the previously known separate arrangement of lighting facility and ventilation channel is that this separate arrangement requires a great deal of space and installation is labor intensive.

SUMMARY OF THE INVENTION

The object of the present invention is therefore to arrange the ventilation channel and lighting facility in a vehicle of the type discussed above in such a manner that as little space as possible is required and the installation can be made simple also by making use of pre-assembled units.

That objective is achieved by way of the invention in that the ventilation channel is in the form of a reflector box with an at least partially light transparent channel base facing the interior of the compartment, and the lighting facility is situated inside the ventilation channel.

This arrangement of lighting according to the invention, integrated in the ventilation channel, results in a smaller amount of space being required than the state-of-the-art solutions. The ventilation channel according to the invention may feature individual lighting elements, lighting strips, air channels, air outlets, air extraction outlets, ventilators, insulation, cables, conduit for cables, reflectors for the lighting elements, fire alarms, fire-fighting units, supports, loudspeakers, information and cladding. The ventilation channel may be subdivided in the longitudinal or transverse direction into at least two longitudinal or transverse sub-channels by walls running in the transverse or longitudinal direction. This enables the lighting elements to be separated from each other individually or in groups, this in the interest of fire prevention. The dividing walls are preferably of glass, metal or a plastic which is difficult to combust, in particular polycarbonate. The sub-channels may be employed to separate the flow of fresh and used air.

BRIEF DESCRIPTION OF THE DRAWINGS

Further advantages, features and details of the invention are revealed in the following description of preferred exemplified embodiments and with the aid of the drawings which show in FIG. 1—a cross-section through a first version of a ventilation channel.

DETAILED DESCRIPTION OF PREFERRED EMBODIMENTS

Figure 1:
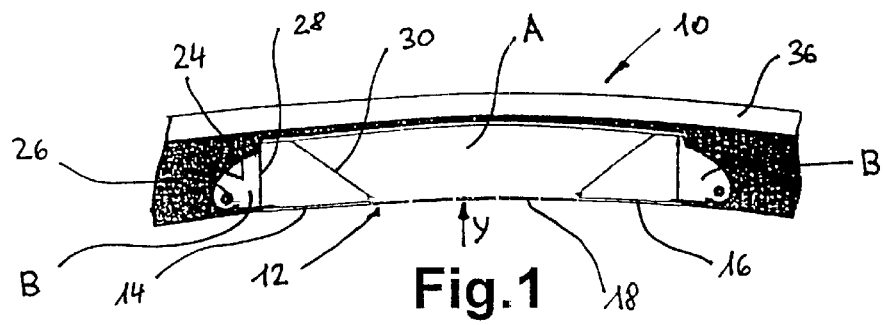

The ventilation channel may e.g. be bent from a single part or laminated in a mold. It may, however, also be made up of two or more parts which are joined in a releasable or permanent manner, or using a combination of any desired form of joining.

A useful version of the ventilation channel is such that the channel base features on both sides longitudinal panels of material which at least in part is transparent to light, preferably glass or a plastic which is difficult to combust, in particular polycarbonate. In the middle, between the side panels, may be a longitudinal base part of the ventilation channel which is at least in part transparent to light and features outlets or extraction openings for air. The air outlets may, however, also be situated at the sides and the light transparent areas in the middle.

The middle part of the ventilation channel base is preferably a panel made at least partially of light-transparent material, preferably a plastic, in particular a panel of polycarbonate, or a sheet, in particular an aluminum sheet with openings, and may be joined to a plastic panel or film that covers the openings in the sheet, and which panel features the air outlets or openings for extracting air.

Fresh air may be blown in and/or used or waste air may be sucked out through the outlet or extraction openings in the plastic panel. Should a fire break out, smoke may be extracted through these openings, or fire-fighting substances may be introduced into the compartment. The arrangement of the openings may vary over the unit or over the total length of the ceiling. This way the air input and/or air extraction can be regulated. The openings in the material not transparent to light may be covered over in part or wholly by a light-transparent material so that the free area for air flow in and out can be adjusted according to particular requirements. The desired air flow may be achieved by means of the number and dimensioning of the individual holes.

The lighting may be made such that the light from one or more light sources or lighting elements passes directly and/or indirectly through the partially light-transparent panels and/or openings in the material not transparent to light. Instead of openings regions not transparent to light may be created in the light-transparent materials also by printing non-light-transparent material onto it. The openings or printing may be used e.g. to indicate the general direction for walking in the compartment or the direction of escape. By printing material which is not transparent to light using colors which block light to a greater or lesser degree, it is also possible to create advertising in word or pictures.

The lighting may be made such that one or more light sources feed light to one or more light conducting materials and the light from these transported to the point of exit for the light.

The ventilation channel may be installed in such a manner that access to the lighting elements is gained from outside or inside the ventilation channel.

Cables and/or conduit for cable may be attached or laid via appropriate fixtures on the inside or outside of the ventilation channel.

The reflectors of the lighting elements may be installed as separate parts. The function of the reflectors may, however, also be performed by the ventilation channel itself by appropriate shaping and/or choice of surface on the inside of the ventilation channel.

Fire alarms and/or temperature sensors may be situated inside or outside the ventilation channel. If these sensors are mounted,inside the ventilation channel, the flushing with air improves their function, in particular reducing the reaction time.

The fire alarms may be used e.g. also to sense the air and/or the degree of pollution in the ventilation channel.

A fire-fighting unit may be installed inside or outside the ventilation channel.

Loudspeakers may be attached inside or outside the ventilation channel, thus using the ventilation channel as a resonance box.

The ventilation channel may be decoupled to the ceiling or side wall structure by means of rigid or flexible connections.

The walls of the ventilation channel may be insulated thermally or acoustically. This insulation may be applied and/or attached to the inside and/or outside of the walls of the ventilation channel facing away from the passenger compartment. On the outside or inside of the ventilation channel a transparent insulation may be applied or attached onto the at least partially transparent parts. By choosing the appropriate material and/or material combination the insulating properties may also be taken over directly by the walls of the ventilation channel, e.g. by using composite materials such as aluminum-plastic-aluminum sandwich panels.

In a useful version of the invention the ventilation channel includes individual pre-assembled units. Any desired length can be made by installing one or more such units. To perform work intensive repairs, such individual units may be dismantled or replaced.

The pre-assembled units may be mounted together in a rigid manner, or flexibly, using elastic means of connection. The connection may usefully be made using a releasable means of connection. Releasable means of connection that come into question are in particular screws, fast-closing means, interlocking closures (Velcro®), snap-fit closures and shape-fit closures. Suitable permanent attachment means are e.g. riveting, welding and adhesive bonding. Of course it is also possible to employ a combination of any desired means of attachment.

Using a rigid form of mounting allows the optical displacement to be reduced to a minimum. A flexible, decoupled, installation minimizes in particular the forces transmitted between the individual units.

The design can be influenced in particular by applying printing, lacquer coating, films or other materials and/or by the arrangement of the openings, and combinations thereof.

Figure 2:
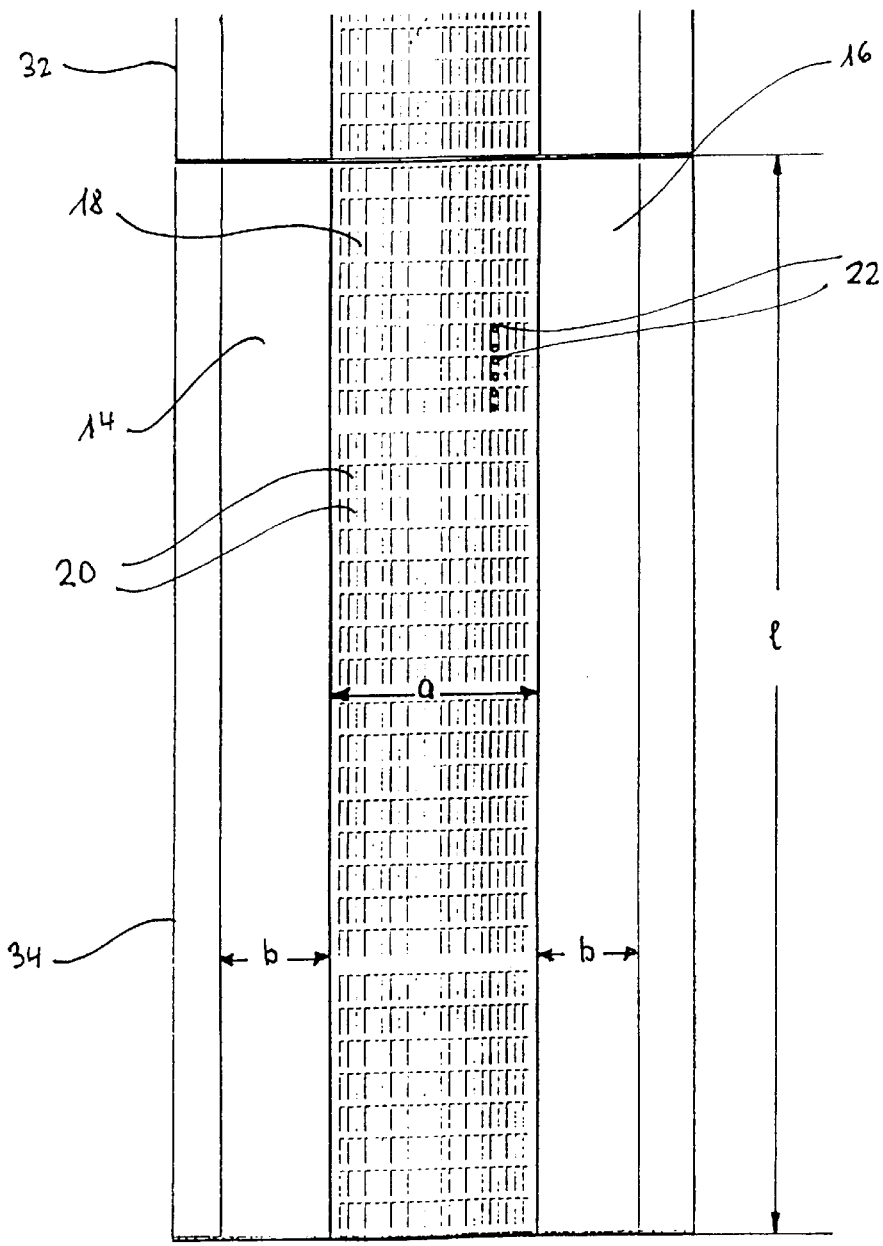
FIG. 2—a plan view of the base part of the ventilation channel shown in FIG. 1 viewed in direction y.

Referring to the drawings, a channel base 12 of a ventilation channel 10 facing the interior of the compartment features at the sides panels 14, 16 which are transparent to light. Situated between these panels 14, 16 is an aluminum sheet 18 covered with a light-transparent plastic panel. The aluminum sheet 18 features openings 20 for the passage of light. The plastic panel attached to the aluminum sheet 18 features openings 22 for the passage of air which for reasons of clarity are shown in FIG. 2 by way of example only by six air openings 22 in the region of three openings 20 for light. Lighting elements 26 are provided in the sides 24 of the channel walls which are in the form of reflectors.

Figure 3:
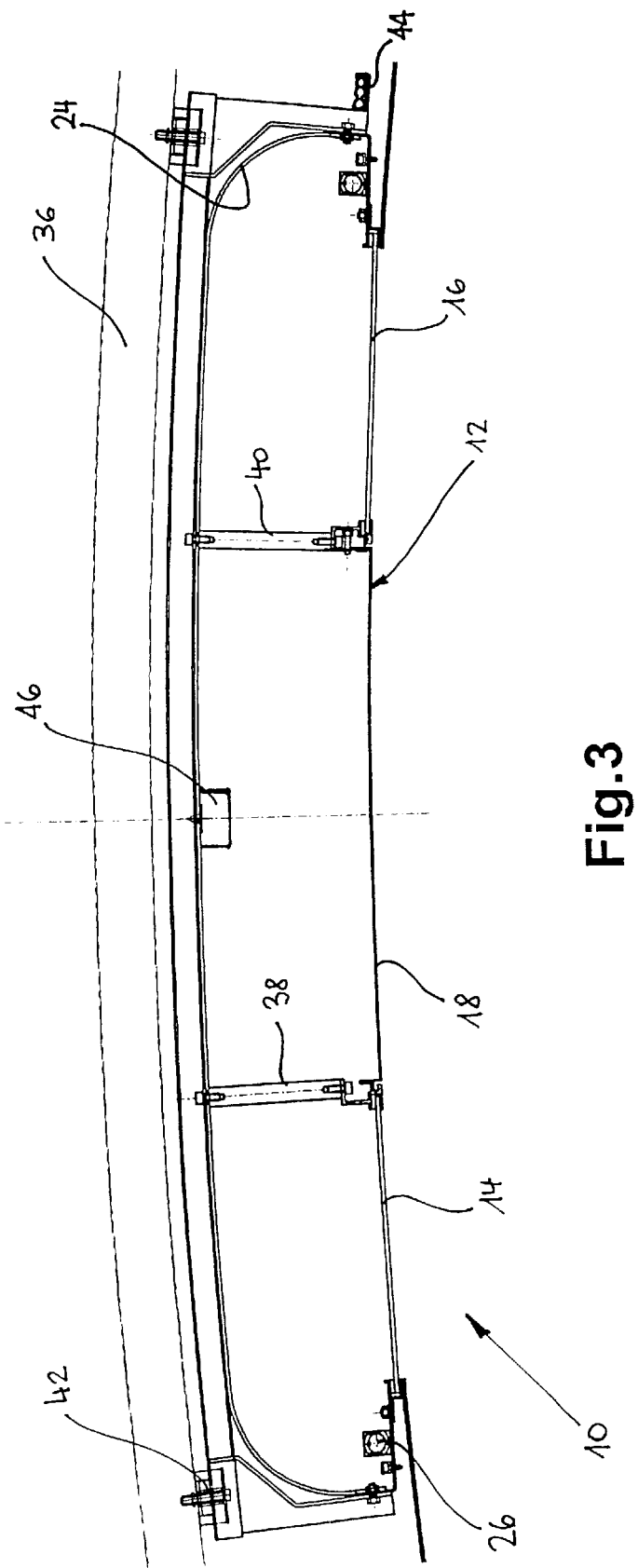
FIG. 3—a cross-section through another version of a ventilation channel.

The ventilation channel 10 in FIG. 1 is divided by two dividing walls 28 into a central sub-channel A and two side sub-channels B which may be used differently e.g. for separate transporting of fresh air and used air. The aluminum sheet 18 is fixed in place by separate means of suspension 30. The ventilation channel 10 is, not shown in FIG. 1, attached to the ceiling structure 36. In the version shown in FIG. 3 special means of suspension 38, 40 are provided for the panels 14, 16 and for the aluminum sheet 18. The ventilation channel 10 is screwed to the ceiling structure 36 by means of screw connections 42.

A channel 44 for cables is provided outside the ventilation channel 10. A fire fighting unit 46 is installed inside the ventilation channel 10.

As can be seen from FIG. 2, the ventilation channel 10 is made up of units 32, 34. The units 32, 34 are of length l. The transparent panels 14, 16 are of breadth b; the aluminum sheet 18 employed as middle part is of breadth a.

What is claimed is:

1. Ventilation channel for a vehicle with a compartment, which comprises a vehicle with a compartment, at least one ventilation channel situated on the ceiling or on a side wall of said vehicle compartment running in the longitudinal or transverse direction of the vehicle, and a lighting facility therein with lighting elements therein, wherein the ventilation channel is in the form of a reflector box with a channel base which faces the interior of the compartment and is at least in part transparent to light, wherein the sides of the ventilation channel walls are in the form of reflectors, and wherein the ventilation channel includes a central channel and two side channels, with the lighting elements of the lighting facility arranged inside the ventilation channel at the sides thereof inside the side channels.

2. Ventilation channel according to claim 1, wherein the ventilation channel is divided at least one of in the longitudinal and transverse directions into at least one of two transverse and two longitudinal sub-channels, by dividing walls running at least one of longitudinally and transversely.

3. Ventilation channel according to claim 2, wherein the dividing walls are of a material selected from the group consisting of glass, metal and of a plastic which is difficult to combust.

4. Ventilation channel according to claim 1, wherein the ventilation channel features on both sides thereof longitudinal base parts of the ventilation channel which are at least in part transparent to light and have outlet or extraction openings for air, and in the middle thereof between the base parts at the side, a further longitudinal panel is provided made of a material which is at least in part transparent to light.

5. Ventilation channel according to claim 4, wherein said at least in part transparent material is selected from the group consisting of glass, metal and plastic which is difficult to combust.

6. Ventilation channel according to claim 1, wherein the channel base features at least one longitudinal panel made of a material which is at least in part transparent to light.

7. Ventilation channel according to claim 6, wherein said at least one longitudinal panel is selected from the group consisting of glass, metal and a plastic which is difficult to combust.

8. Ventilation channel according to claim 6, wherein said longitudinal panel includes outlet or extraction openings for air.

9. Ventilation channel according to claim 1, wherein the channel base includes at least one longitudinal base part of the ventilation channel which is at least in part transparent to light and features outlet or extraction openings for air.

10. Ventilation channel according to claim 1, wherein the channel base features on both sides longitudinal panels of a material which is at least in part transparent to light and in the middle between the panels running at the sides thereof at least one longitudinal base part of the ventilation channel which is at least in part transparent to light and features outlet or extraction openings for air.

11. Ventilation channel according to claim 10, wherein said longitudinal panels are selected from the group consisting of glass, metal and a plastic which is difficult to combust.

12. Ventilation channel according to claim 10, wherein the longitudinal base part of the ventilation channel is of a material which is at least in part transparent to light.

13. Ventilation channel according to claim 12, wherein said longitudinal base part is selected from the group consisting of a plastic panel and an aluminum sheet with openings.

14. Ventilation channel according to claim 10, wherein the longitudinal base part with openings is joined to a plastic panel or film which covers the openings in the sheet and includes openings for the outlet or extraction of air.

15. Ventilation channel according to claim 1, wherein the ventilation channel is attached at least one of rigidly or flexibly by means of elastic connections to the ceiling or side wall structure.

16. Ventilation channel according to claim 1, wherein the ventilation channel is in the form of individual pre-assembled units.

17. Ventilation channel according to claim 16, wherein the pre-assembled units are mounted on to each other at least one of rigidly or flexibly by means of elastic connections.

18. Ventilation channel according to claim 1, wherein a fire fighting unit is installed at least one of inside or outside the ventilation channel.

19. Ventilation channel according to claim 1, wherein a cable channel is installed at least one of inside or outside the ventilation channel.

* * * * *